United States Patent [19]

Jessup

[11] Patent Number: 4,854,184
[45] Date of Patent: Aug. 8, 1989

[54] SUPPORT SYSTEM FOR SHAFT

[76] Inventor: Thurman W. Jessup, 130 Jeanine Way, Anaheim, Calif. 92806

[21] Appl. No.: 538,711

[22] Filed: Nov. 7, 1983

[51] Int. Cl.$^4$ .................. B63H 23/34; F16D 3/64; F16H 57/00
[52] U.S. Cl. ........................ 74/411; 440/83; 464/92; 464/182; 464/183
[58] Field of Search ............... 464/182, 92, 183, 179, 464/178; 74/411, 410; 440/82, 83

[56] References Cited

U.S. PATENT DOCUMENTS

| | | | |
|---|---|---|---|
| 1,390,464 | 9/1921 | Senstius | 464/178 |
| 1,522,182 | 1/1925 | Graeber | 464/182 |
| 1,697,046 | 1/1929 | Chapman et al. | 464/178 |
| 2,521,368 | 9/1950 | Hingerty, Jr. | 440/83 |
| 2,659,240 | 11/1953 | Rubbra et al. | 74/410 |
| 2,889,695 | 6/1959 | Moeller | 464/183 |
| 3,257,869 | 6/1966 | Sharples | 74/410 |
| 3,401,580 | 9/1968 | Sigg | 74/411 |
| 3,407,779 | 10/1968 | Satterthwaite et al. | 440/82 |
| 3,434,374 | 3/1969 | Barwig et al. | 74/410 |
| 3,499,343 | 3/1970 | Burkhardt et al. | 464/92 |
| 3,530,733 | 9/1970 | Heidrich | 74/410 |
| 4,112,866 | 9/1978 | Ciggen | 440/83 |
| 4,121,532 | 10/1978 | Coryell, III | 440/83 |
| 4,127,080 | 11/1978 | Lakiza et al. | 464/183 |
| 4,197,758 | 4/1980 | Tetard | 74/410 |
| 4,273,229 | 6/1981 | Voll | 464/178 |
| 4,287,791 | 9/1981 | Numazawa et al. | 74/375 |
| 4,471,602 | 9/1984 | Leigers | 464/182 |

Primary Examiner—Allan D. Herrmann
Attorney, Agent, or Firm—Jessup, Beecher & Slehofer

[57] ABSTRACT

A shaft is coupled to a circumjacent gear substantially midway between the bearings at each side of the gear. This substantially equalizes the vertical loading on the gear bearings—eliminating the tilt or cant in the gear which would otherwise result, and minimizing abnormal tooth wear in the gearing system. An example of the present invention is a long driving shaft such as the drive shaft of a propeller in a large ship.

6 Claims, 1 Drawing Sheet

SUPPORT SYSTEM FOR SHAFT

BACKGROUND OF THE INVENTION

Figure 1:
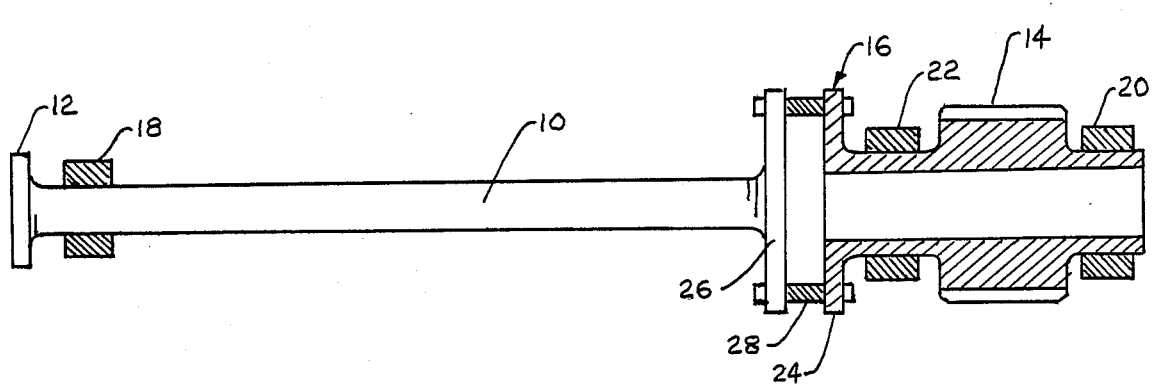
FIG. 1 illustrates a present known technique for coupling and supporting a long shaft and circumjacent gear.

A known technique for supporting a long, heavy shaft, such as a propeller shaft for an ocean going ship, is shown in FIG. 1. In the figure, 10 represents a long, heavy propeller shaft, to the after end 12 of which is mounted a propeller (not shown) which propels the ship through the water. To the forward end of the shaft 10 is mounted a driving gear 14, known as a bull gear. To compensate for slight angular offset between the rotative axis of the bull gear 14 and that of the shaft 10, it is customary to couple the gear 14 to the shaft 10 by means of a flexible coupling 16. An example of a coupling suitable for this purpose is shown in U.S. Pat. No. 4,055,966.

At its after end, the propeller shaft 10 is supported by an after mounting bearing 18. At its forward end, the shaft 10 is supported by being secured to the bull gear 14 (through the flexible coupling 16), which in turn is supported by a pair of bearings 20 and 22 mounted, one at each side of the gear 14.

The flexible coupling 16 is effected by providing the bull gear 14 with a flange 24 and providing the shaft 10 with a flange 26 which faces the flange 24 on the shaft 10. Mounted between, and secured to, the respective flanges 24 and 26, is a pliant, annular ring 28, which imparts the rotation of gear 14 to shaft 10, while still permitting slight angular offset between the respective axes of the gear 14 and the shaft 10.

The bearings 18, 20 and 22 are typically sleeve bearings. In a typical ocean going ship it is necessary for the shaft 10 to be quite long in order to isolate structurally the gear 14 and its housing from the propeller driving end 12 of the shaft 10. The major purpose of the flexible coupling 16 is to accommodate sagging of the shaft 10 between bearings 18 and 22, and to accomodate other alignment variations which change with the passage of time.

The bull gear 14 is driven by a plurality of driving pinions (not shown), which are spaced circumferentially around the bull gear 14 and which apply torque thereto. This torque is transmitted through coupling 16 to the shaft 10 and thence to the propeller at 12.

The major shortcoming in the prior art to which the present invention is addressed is that the heavy weight at the forward, right hand end of the shaft, where it is supported by the bull gear 14, is transmitted as a vertical load (through the flexible coupling 16) to the gear bearings 20 and 22. Since the bearing 22 is closer to the coupling 16 than is the bearing 20, the bearing 22 takes a much higher percentage of the vertical gravity load resulting from the weight of the right hand end of the shaft 10 than does the bearing 20. This causes the rotative axis of the gear 14 to tilt or cant slightly within the clearances of the sleeve bearings 20 and 22, and places uneven loads upon the engagement between the teeth of the driving pinions (not shown) and the teeth of the gear 14. The teeth, particularly the pinion teeth, are thus subjected to abnormal wear and fatigue, and must be checked and replaced quite often.

SUMMARY OF THE INVENTION

The present invention consists of a structure which allows the weight of one end of a long, heavy shaft, to which a drive gear is connected, to be placed substantially midway between the gear bearings, one on each side of the gear. This equalizes the downward or weight load of the shaft on the gear bearings and minimizes angular cant or tilt of the gear, which would result in abnormal wear on the teeth where the gear and circumjacent pinions engage.

DESCRIPTION OF THE PREFERRED EMBODIMENTS

Figure 2:
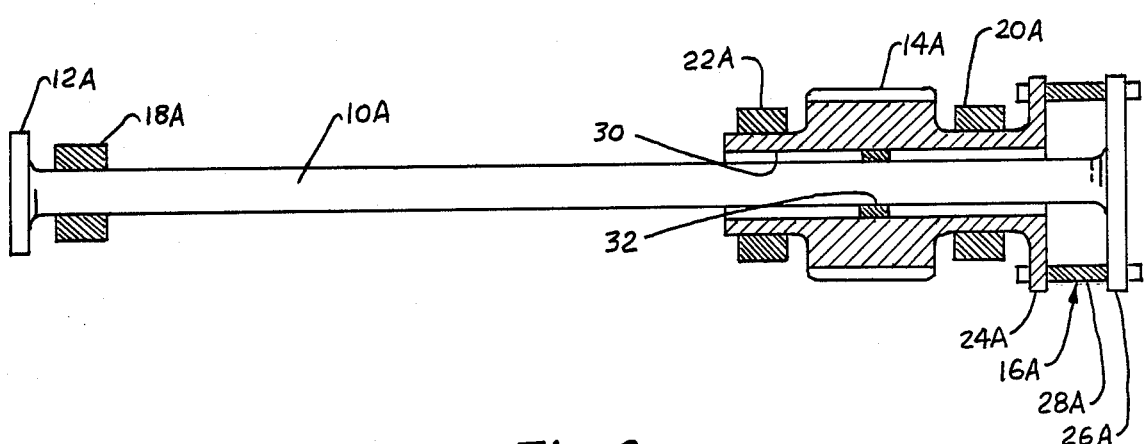
FIG. 2 illustrates a preferred form of the present invention.

In accordance with the present invention, shown in FIG. 2, the shaft 10A passes through the central bore 30 of the gear 14A and is coupled to the gear by a flexible coupling 16A, which is located at the forward side of the gear 14A, opposite from the after side, where the shaft bearing 18A is located. Substantially midway between the two gear bearings 20A and 22A is an annular support means in the form of a load transmitting sleeve or ring 32, positioned within the bore 30 and in bearing contact with the gear 14A and the shaft 10A. In this way the weight of the forward end of the shaft 10A is applied to the gear 14A (and hence to its bearings 20A and 22A) substantially midway between the two bearings 20A and 22A. This equalizes the loads on the bearings and eliminates the tilt or cant in the axis of the gear 14A, which in the prior art produces abnormal wear and fatigue on gear and pinion teeth.

As in the prior art, the torque from the gear 14A is transmitted to the shaft 10A through a flexible coupling 16A, comprised essentially of a flange 24A on the gear 14A, a facing flange 26A on the forward end of the shaft 10A, and an annular pliant ring 28A.

Figure 3:
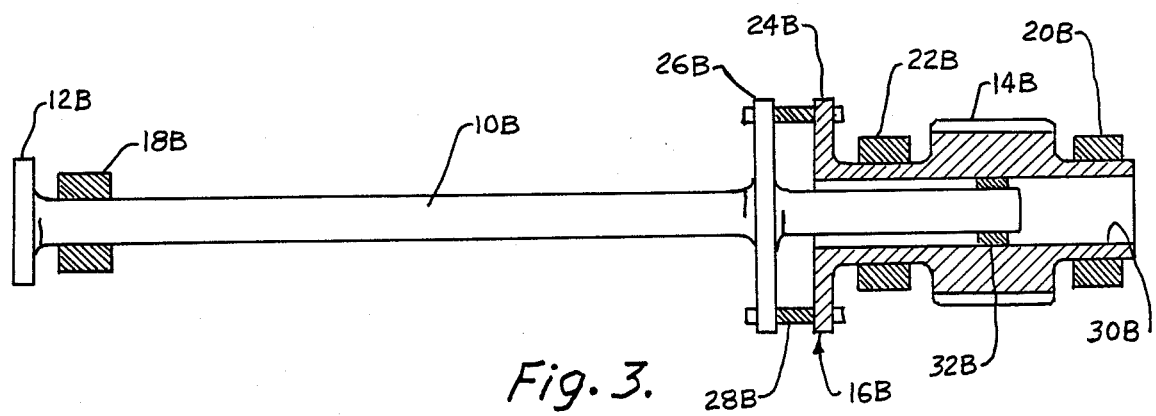
FIG. 3 illustrates an alternate form of the invention.

The present invention may be practiced in a structure in which the flexible coupling 16 is either on the opposite side of the gear 14 from the shaft bearing 18 (as in FIG. 2), or is on the side of the gear intermediate the shaft bearing 18 and the bearing 22, as shown in FIG. 3. In both embodiments, the shaft 10 extends at least half way into the bore 30 of the gear 14, in order to provide a mounting point for the annular support ring 32, which is substantially midway between the two gear bearings 20 and 22.

In both embodiments of the present invention shown in FIGS. 2 and 3, substantially the entire weight of the forward (right hand) end of the shaft 10A is applied to the gear 14A substantially at the gear mid-point, where the support ring or annulus 32 applies the weight of the forward end of the shaft 10 to the gear. Since this is substantially midway between the two gear bearings 20A and 22A, the downward loading on the bearings is substantially equalized.

A tiny portion of the shaft weight may possibly be transmitted through the coupling 16A, but this would be insignificant compared to the weight transmitted through the support ring 32.

For precise equalization of bearing load, the ring 32 should be offset slightly from the geometric center of the gear 14, in a direction away from the flexible coupling 16. This is because, in the absence of the shaft 10, the flange 24 on the gear 14 creates a slight initial unbalance in loading on the gears. This may be offset by positioning the ring 32 slightly off center, in a direction away from the flange. The offset required may be readily determined by calculating the weight imposed by the shaft 10 on the gear 14, and the unbalance in load resulting from the presence of the assymetrically located coupling 16. However, such precise equalization of bearing load is not essential to the practice of this invention.

What is claimed is:

1. Support system for a substantially horizontal shaft with gear coupled thereto, comprising:
   a shaft mounted for rotation about its geometric longitudinal axis;
   shaft bearing means adjacent one end of said shaft;
   a gear adjacent the other end of said shaft having an axis of rotation and an axial bore;
   a pair of gear bearings, one at each side of said gear, for mounting said gear coaxially of said shaft;
   said shaft extending into said bore at least substantialy midway between said bearings;
   coupling means for connecting said shaft and said gear to impart rotation therebetween;
   annular support means circumjacent said shaft, spaced axially from said coupling means and within said bore substantially midway between said gear bearings, for transmitting the weight of said shaft to said gear bearings.

2. Support system in accordance with claim 1, wherein:
   said coupling means is of the flexible coupling type, which rotatively couples said gear and shaft together while permitting limited flexing between the respective axes of said gear and shaft.

3. Support system in accordance with claim 2, wherein: said gear has a flange at one side thereof; said shaft has a flange facing said gear flange; pliant coupling means intermediate and secured to said flanges to form said flexible coupling.

4. Support system in accordance with claim 3, wherein: said gear is located between said flanges and said shaft bearing means.

5. Support system in accordance with claim 3 wherein:
   said flanges are located between said gear and said shaft bearing means.

6. Support system in accordance with claim 1 wherein:
   said annular support means is positioned slightly away from the mid point between said gear bearings in a direction away from said coupling means.

* * * * *